(No Model.)

A. NEER.
THILL COUPLING.

No. 443,649. Patented Dec. 30, 1890.

Witnesses
E. S. Duvall Jr.
H. J. Riley

Inventor
Adam Neer.
By his Attorneys,
C. A. Snow & Co.

UNITED STATES PATENT OFFICE.

ADAM NEER, OF ST. PARIS, OHIO.

THILL-COUPLING.

SPECIFICATION forming part of Letters Patent No. 443,649, dated December 30, 1890.

Application filed September 18, 1890. Serial No. 365,396. (No model.)

*To all whom it may concern:*

Be it known that I, ADAM NEER, a citizen of the United States, residing at St. Paris, in the county of Champaign and State of Ohio, have invented a new and useful Thill-Coupling, of which the following is a specification.

The invention relates to improvements in thill-couplings.

The object of the present invention is to provide a simple and inexpensive thill-coupling capable of readily taking up the wear of the parts, and thereby prevent noise and rattling.

The invention consists in the construction and novel combination and arrangement of parts hereinafter fully described, illustrated in the accompanying drawings, and pointed out in the claim hereto appended.

Figure 1:
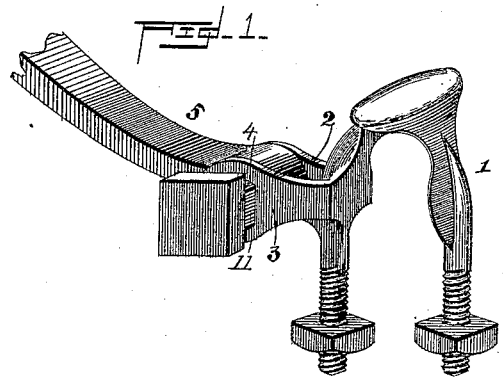
Figure 2:
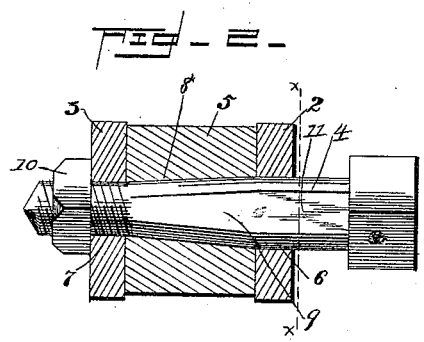
Figure 3:
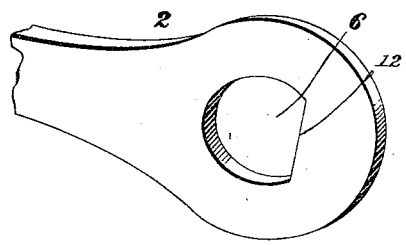
Figure 4:
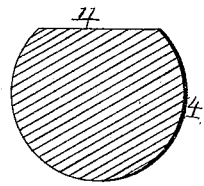

In the drawings, Figure 1 is a perspective view of a thill-coupling embodying the invention. Fig. 2 is a transverse sectional view, the bolt being shown in elevation. Fig. 3 is a detail view of one of the ears of the axle-clip. Fig. 4 is a detail sectional view of the coupling-bolt.

Referring to the accompanying drawings, 1 designates an axle-clip provided on its front arm with forwardly-extending parallel side plates 2 and 3, through which passes a coupling-bolt 4 and between which is pivotally secured a shaft iron or heel 5.

The side plates 2 and 3 are provided with bolt-openings 6 and 7, and the shaft iron or heel 5 is provided with a transverse opening 8, adapted for the reception of a conical portion 9 of the bolt 4, and the latter is adapted to be advanced into the transverse opening of the shaft iron or heel as the parts become worn to take up the wear to prevent noise and rattling, and the threaded end of the bolt is engaged by a nut 10 and passes through the opening 7 of the side plate 3, against which the nut bears. The threaded portion of the bolt is of the same diameter as the smaller end of the conical portion 9, which is arranged about midway the length of the bolt, and the latter between the conical portion and the head has a flat face 11, which engages the straight portion 12 of the segmental bolt-opening 6 of the side plate 2 of the axle-clip. This construction prevents the bolt turning in the bolt openings or bearings of the parallel side plates and forms a nut-lock that prevents the nut 10 unscrewing and becoming lost, and avoids accidents incident to the displacement of the coupling-bolt. The portion 11 of the bolt is of greater length than the thickness of the side plate 2, and the head of the bolt is arranged some distance from the adjacent side plate to compensate for considerable wear of the parts.

It will readily be seen that the thill-coupling is simple and comparatively inexpensive in construction, and is capable of readily taking up the wear of the parts to prevent noise and rattling and securely retain the nut of the coupling-bolt and prevents its loss.

What I claim is—

In a thill-coupling, the combination of the axle-clip provided with forwardly-extending side plates 2 and 3, having the segmental opening 6 and the circular opening 7, the shaft iron or heel having the transverse conical opening 8, and the coupling-bolt having at one end an integral head and provided intermediate of its ends with the conical portion 9 to engage the said opening 8 of the shaft iron or heel, and having between the conical portion 9 and the head the portion 11, arranged to be advanced into the coupling as the parts become worn, and provided with a flat face and adapted to engage the segmental opening 6, the said portion 11 being of greater length than the thickness of the adjacent side plate 2, substantially as and for the purpose described.

In testimony that I claim the foregoing as my own I have hereto affixed my signature in presence of two witnesses.

ADAM NEER.

Witnesses:
L. S. DARNELL,
J. P. NORTHCUTT.